United States Patent [19]
Yoon et al.

[11] Patent Number: 5,166,500
[45] Date of Patent: Nov. 24, 1992

[54] BARCODE READER DECODER SYSTEM

[75] Inventors: Kee S. Yoon; Gun S. Yoon, both of Seoul, Rep. of Korea

[73] Assignee: Goldstar Co., Ltd., Rep. of Korea

[21] Appl. No.: 753,644

[22] Filed: Aug. 30, 1991

[30] Foreign Application Priority Data

Aug. 31, 1990 [KR] Rep. of Korea .......... 13828/1990[U]
Aug. 31, 1990 [KR] Rep. of Korea .......... 13830/1990[U]

[51] Int. Cl.⁵ ............................................. G06K 7/10
[52] U.S. Cl. .................................. 235/463; 235/462; 235/466
[58] Field of Search .................. 235/462, 463, 466

[56] References Cited

U.S. PATENT DOCUMENTS

4,087,681 5/1978 Spencer ........................... 235/466
4,687,912 8/1987 Ohta ................................. 235/463
4,728,784 3/1988 Stewart ........................... 235/463

Primary Examiner—Harold Pitts
Attorney, Agent, or Firm—Blakely, Sokoloff, Taylor & Zafman

[57] ABSTRACT

Together with the Delta Distance Method, barcode data can be correctly read by converting to a digital signal an optical signal scattered from a barcode. Two types of toggle signals are generated every time the digital signal changes from high potential to low potential or vice versa and other toggle signals opposite to said toggle signals. The width of said 4 types of toggle signals are counted and various signals are detected necessary to read barcode data in use of said count signals.

9 Claims, 10 Drawing Sheets

| numbers | left barcode | right barcode | module sum of space and bar in close proximity | | |
|---|---|---|---|---|---|
| 0 | 0001101 | 1110010 | 5 | 3 | 2 |
| 1 | 0011001 | 1100110 | 4 | 4 | 3 |
| 2 | 0010011 | 1101100 | 3 | 3 | 4 |
| 3 | 0111101 | 1000010 | 5 | 5 | 2 |
| 4 | 0100011 | 1011100 | 2 | 4 | 5 |
| 5 | 0110001 | 1001110 | 3 | 5 | 4 |
| 6 | 0101111 | 1010000 | 2 | 2 | 5 |
| 7 | 0111011 | 1000100 | 4 | 4 | 3 |
| 8 | 0110111 | 1001000 | 3 | 3 | 4 |
| 9 | 0001011 | 1110100 | 4 | 2 | 3 |

FIG.6

FIG.10A  barcode ("7")

FIG.11A  barcode ("0")

BARCODE READER DECODER SYSTEM

BACKGROUND OF THE INVENTION

The present invention relates to a barcode reader, more particularly to a barcode reader decoding system which software-processes barcode-related data received from first-in first-out (FIFO) memory in use of the Delta Distance Method and then correctly transmits the software-processed barcode-related data to a host computer through serial transmission interface.

Figure 1:
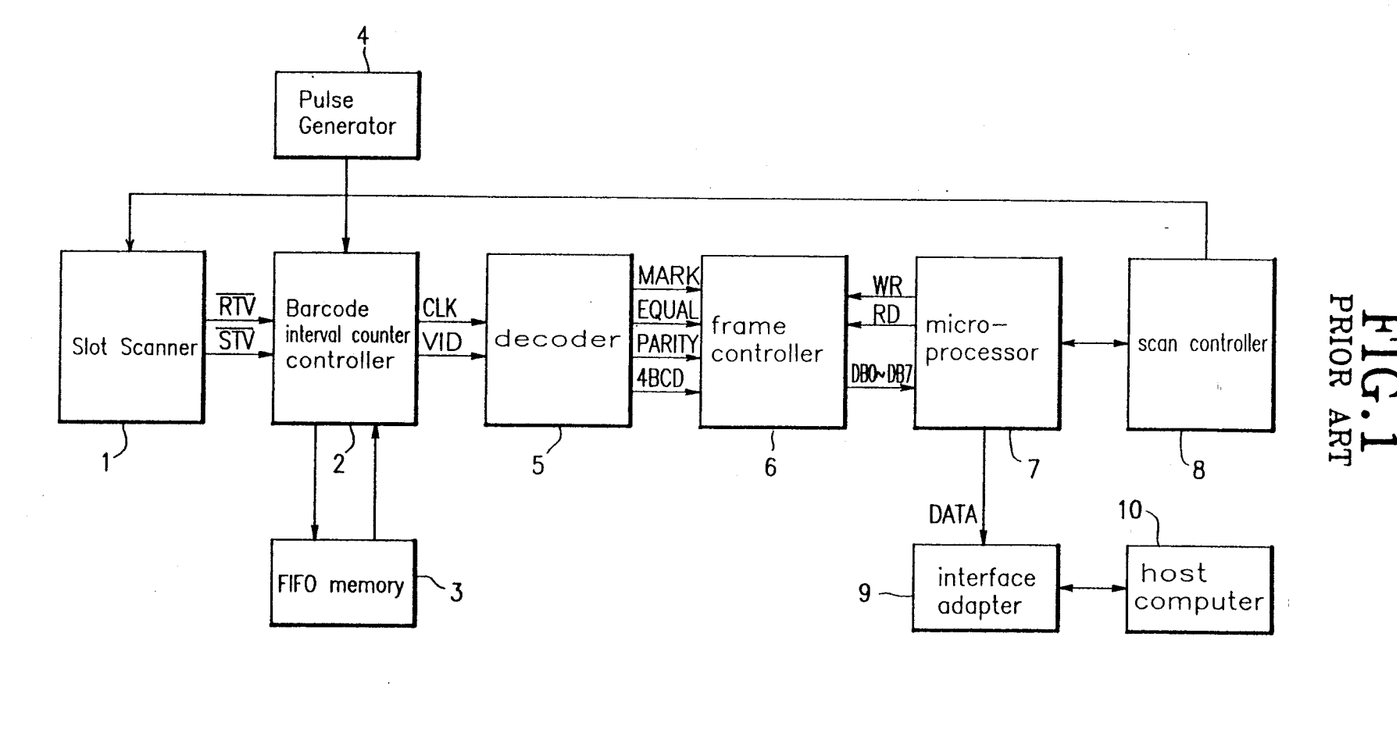
FIG. 1 shows a block diagram of a conventional barcode reader decoding system.

FIG. 1 shows a block diagram of a conventional barcode reader decoding system comprising:

a slot scanner 1 which converts an optical signal scattered from a barcode to a digital signal, a barcode interval counter controller 2 which counts in binary the number of intervals of the digital signal of the slot scanner 1, a FIFO memory 3 which stores the barcode digital signal of the barcode interval counter controller 2 and also sends out the stored data in synchronization with clock pulse of pulse generator 4, a decoder 5 which decodes data from the FIFO memory 3, a frame controller 6 which separates normal data of the barcode from data of the decoder 5, a microprocessor 7 which checks and processes data of the barcode from the frame controller 6 and controls the slot scanner 1 through scan controller 8 in order to determine whether the barcode is on a position read by the slot scanner 1, and an interface adapter 9 which interfaces to a host computer 10 the normal barcode generated from the microprocessor 7.

The operation of a conventional barcode reader decoding system having the above configuration will be described below.

The slot scanner 1 converts to an electrical signal an optical signal scattered from a barcode by means of a control signal of the scan controller 8 which is controlled by the microprocessor 7, generates a digital pulse of a space/bar transistion signal $\overline{STV}$ indicating changes from a space to a bar or of a bar/space transistion signal $\overline{RTV}$ indicating changes from a bar to a space, and applies the digital pulse to the barcode interval counter controller 2.

At this time, the barcode interval counter controller 2 counts in binary the respective time intervals of the space/bar transistion signal $\overline{STV}$ and the bar/space transistion signal $\overline{RTV}$ and stores the counting results in the FIFO memory 3.

That is, the barcode interval counter controller 2 is disabled with the signals $\overline{STR}$, $\overline{RTV}$ of the slot scanner 1, time interval count signals of the space/bar transistion signal $\overline{STV}$ and the bar/space transition signal $\overline{RTV}$ are applied to the FIFO memory 3 together with a signal VID indicating "1" on a bar and "0" on an interval.

At this time, the barcode interval counter controller 2 is reset and a next bar signal is counted. The data stored in the FIFO memory 3 is sent out to the decoder 5 in synchronization with clock pulse of pulse generator 4 while 11-bit binary data indicating an entire barcode width, signal VID indicating whether an interval is a bar or a space, and clock pulse CLK are applied to the decoder 5.

Hence, the decoder 5 produces a BCD bit indicating a decimal character according to the data from the FIFO memory 3, and a 4-bit BCD code indicating left margin, right margin, center band, error and the like. That is, a mark signal MARK indicating whether a barcode interval means a bar or a space, an equal signal EQUAL indicating if the present barcode interval together with three prior intervals are equal to present interval, and a parity signal PARITY which indicates whether the barcode is an odd parity or an even parity are applied to the frame controller 6.

The frame controller 6 separates proper data or improper data as a barcode from signals of the decoder 5 by means of a read signal RD and a write signal WR coming from the microprocessor 7 and applies separated data to the microprocessor 7.

The microprocessor 7 adjusts the slot scanner 1 through the scan controller 8 in order to determine if the barcode comes to a position read by the slot scanner 1, checks the frame controller 6 when signals of the adjusted slot scanner 1 is applied to the microprocessor 7 through the frame controller 6, performs a correlation analysis and a Module-Ten-Check in order to determine if the barcode data is proper when the separated barcode data is applied to the microprocessor 7, and transmits a proper barcode to the host computer 10 through an interface adapter 9.

However, since such a prior art barcode-reading decode system directly counts spaces and bars by using a space/bar transistion signal $\overline{STV}$ and a bar/space transistuon signal $\overline{RTV}$ of a slot scanner it has drawbacks in that a poor reliability occurs in reading an ink-spread barcode caused when printing a barcode, circuit structure is inevitably complicated due to an intricate decoder construction, and error occurs in case of scanning barcodes at a high speed.

SUMMARY OF THE INVENTION

It is an object of the present invention to provide a barcode reader decoding system that correctly detects barcode data by means of the Delta Distance Method without directly counting bars and spaces of a barcode.

Such an object of the present invention is accomplished by detecting an optical signal scattered from a barcode, converting the optical signals to a digital signal, generating a toggle signal whenever the digital signal changes from a high potential to a low potential and vice versa with making an opposite toggle signal to each of two types of the toggle signals, counting respective width of these four types of toggle signals, and detecting various signals necessay to read data of a barcode by using a count signal.

BRIEF DESCRIPTION OF THE DRAWINGS

Detailed description of the present invention will be explained below with reference to accompanying drawings, wherein.

DETAILED DESCRIPTION OF THE INVENTION

Figure 2:
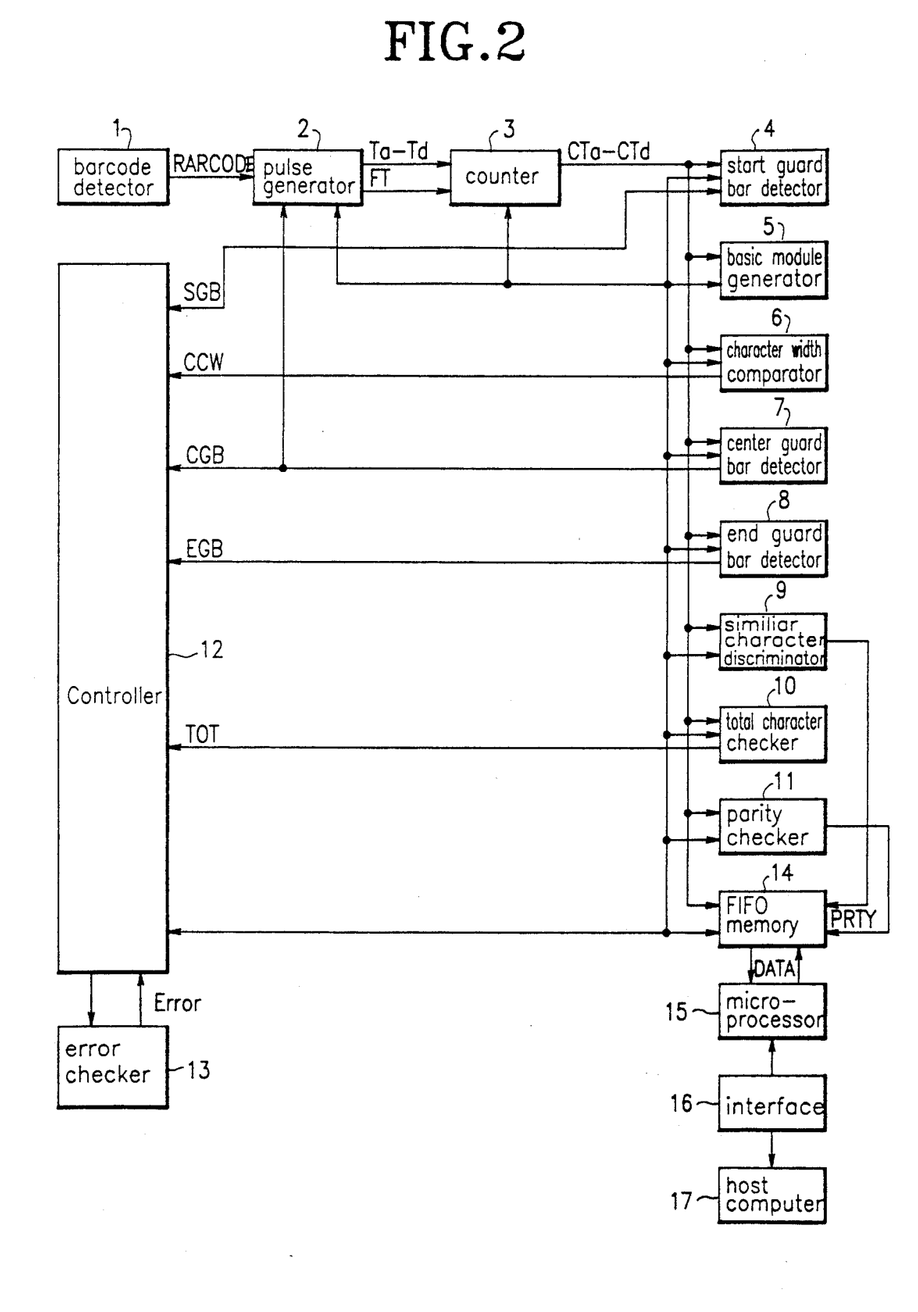
FIG. 2 shows a block diagram of a barcode reader decoding system according to the present invention.

FIG. 2 shows a block diagram of a barcode reader decoding system according to the present invention comprising:

a barcode detector 1 for detecting an optical signal scattered from a barcode and converting it to a digital signal, a pulse generator 2 for generating toggle signals Ta, Tb toggling whenever the digital signal changes from HIGH to LOW and vice versa in the barcode detector 1, toggle signals Tc, Td opposite to the toggle signals Ta, Tb, a counter 3 for counting respective width of the toggle signals Ta-Td of the pulse generator 2 and producing count signals CTa-CTd, a start guard bar detector 4 for detecting a start guard bar which indicates a start signal of a barcode from the count signal of the counter 3 and generating a start guard bar signal SGB, a basic module generator 5 for making a basic module which carries a multiple of the count signal of the counter 3 with respect to one module when the start guard bar signal SGB is detected, a character width comparator 6 for checking if a character is properly constructed in 7 modules by using the basic module generated from the basic module generator 5 when a signal for one character has come from the counter 3, and generating a character width comparating signal CW, a center guard bar detector 7 for checking a center guard bar which is a center signal of a barcode from the count signal of the counter 3, and generating a center guard bar signal CGB, an end guard bar detector 8 for checking an end guard bar which is an end signal of a barcode from the count signal of the counter 3, and generating an end guard bar signal EGB which indicates the end of the barcode, a similar character discriminator 9 for applying to FIFO memory 14 a discrimination signal for making a discrimination between a counter value of a module which a space and a bar close to each other are summed from the counter 3 and a counter value of a module which a bar and a space close to each other are summed from the counter 3, in order to prevent error in a character recognition, a total character checker 10 for checking if the number of character on the left of a center guard bar from the counter 3 is the same as that of character on the right of the same bar, and generating a total character signal TOT, a parity checker 11 for checking whether, in the characters generated from the counter 3, a barcode is entered from the left of a center guard bar or from the right of the same bar, and applying an odd parity or an even parity to the FIFO memory 14, a controller 12 for checking outputs of the start guard bar detector 4 and the character width comparator 6 and storing outputs of the parity checker 11, counter 3 and similar character discriminator 9 in the FIFO memory 14, and checking outputs of the end guard bar detector 8 and total character checker 10 and having control of transmitting data of the FIFO memory 14 to a host computer 17 through a microprocessor 15 and interface 16, and an error checker 13 for receiving through the controller 12 the total character signal TOT of the total character checker 10.

Figure 3A:
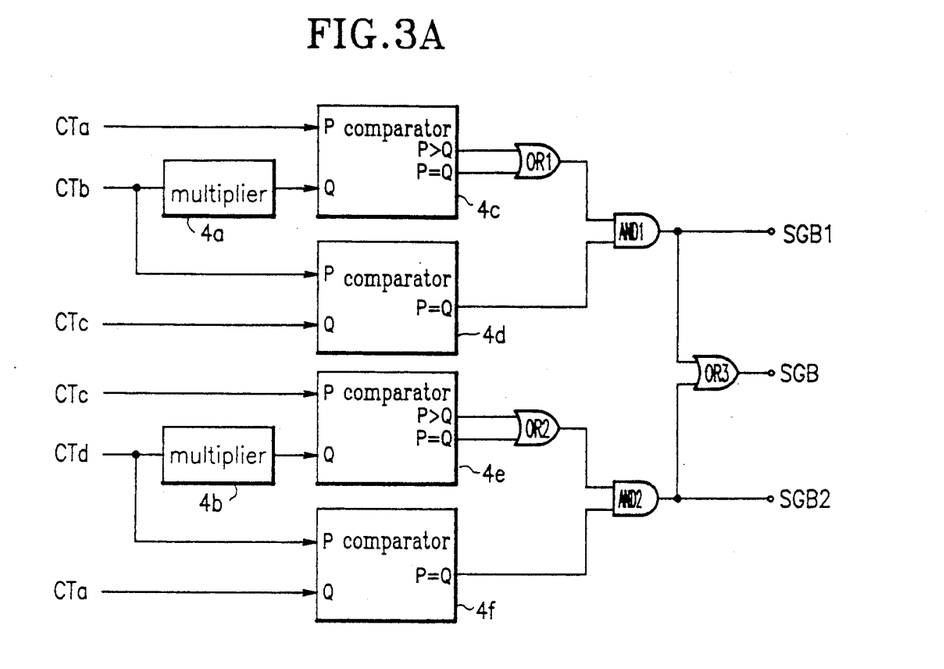
FIGS. 3A-3H show detailed circuits of repective units of FIG. 2.

FIG. 3A shows a detailed block diagram of start guard bar detector 4 in FIG. 2 comprising:

multipliers 4a, 4b for multiplying 4 by count signals CTb, CTd of the counter 3, comparacters 4c, 4e for comparing outputs of the multipliers 4a, 4b with count signals CTa, CTc of the counter 3, respectively, comparators 4d, 4f for comparing count signals CTb, CTd of the counter 3 with count signals CTc, CTa of the same 3, AND gates AND1, AND2 for ANDing signals of the comparators 4d, 4f and signals of the comparators 4c, 4e via OR gates OR1, OR2, and an OR gate OR3 for ORing start guard bar signals SGB1, SGB2 of the AND gates AND1, AND2 and generating start guard bar signal SGB.

Figure 3B:
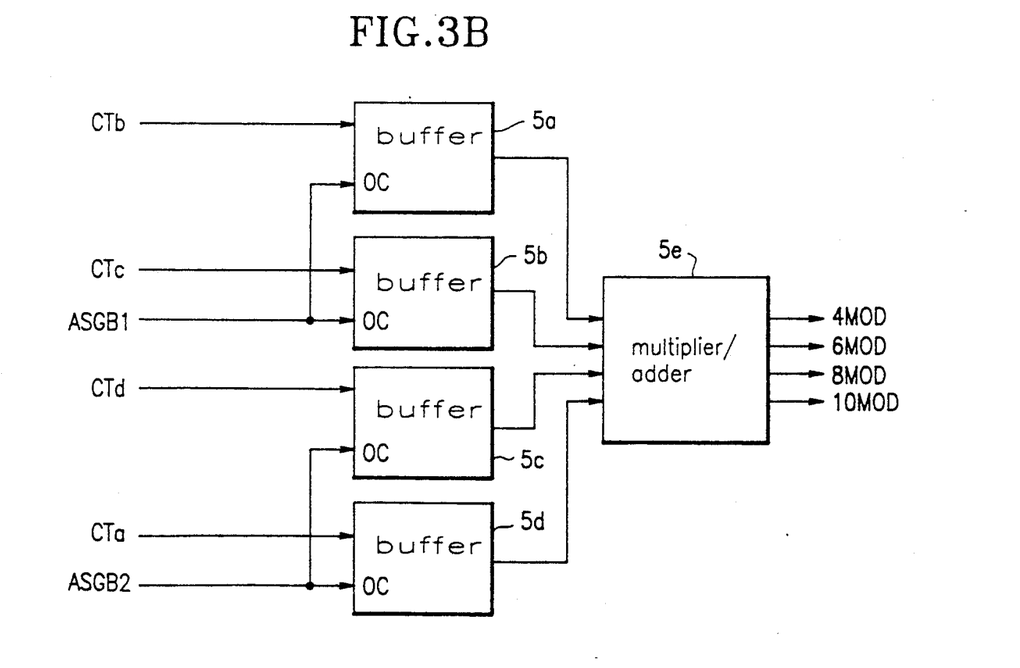

FIG. 3B shows a detailed block diagram of basic module generator 5 in FIG. 2 comprising:

buffers 5a-5d for outputs to be enabled by address start guard bar signals ASGB1, ASGB2 of the controller 12 when respective start guard bar signals SGB1, SGB2 are detected from the start guard bar detector 4, and for buffering respective count signals CTa, CTb, CTc, CTd of the counter 3, and a multiplier/adder 5e for making basic modules 4MOD, 6MOD, 8MOD, 10MOD by multiplying and adding data from the buffers 5a-5d.

Figure 3C:
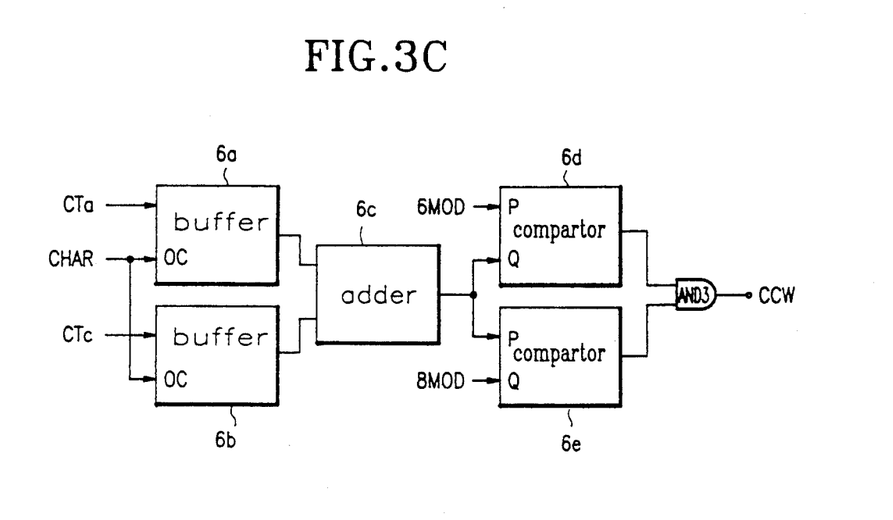

FIG. 3C shows a detailed block diagram of character width comparator 6 in FIG. 2 comprising:

buffers, 6a, 6b for outputs to be enabled by character signal CHAR notifying the end of one character of the controller 12 and for buffering respective counter signals CTa, CTc of the counter 3, an adder 6c for adding toggle signals Ta, Tc of the buffers 6a, 6b, comparators 6d, 6e for comparing data from the adder 6c with respective basic modules 6MOD, 8MOD produced from multiplier/adder 5e of the basic module generator 5, and an AND gate AND3 for ANDing signals of the comparator 6d, 6e and generating character width comparison signal CCW.

Figure 3D:
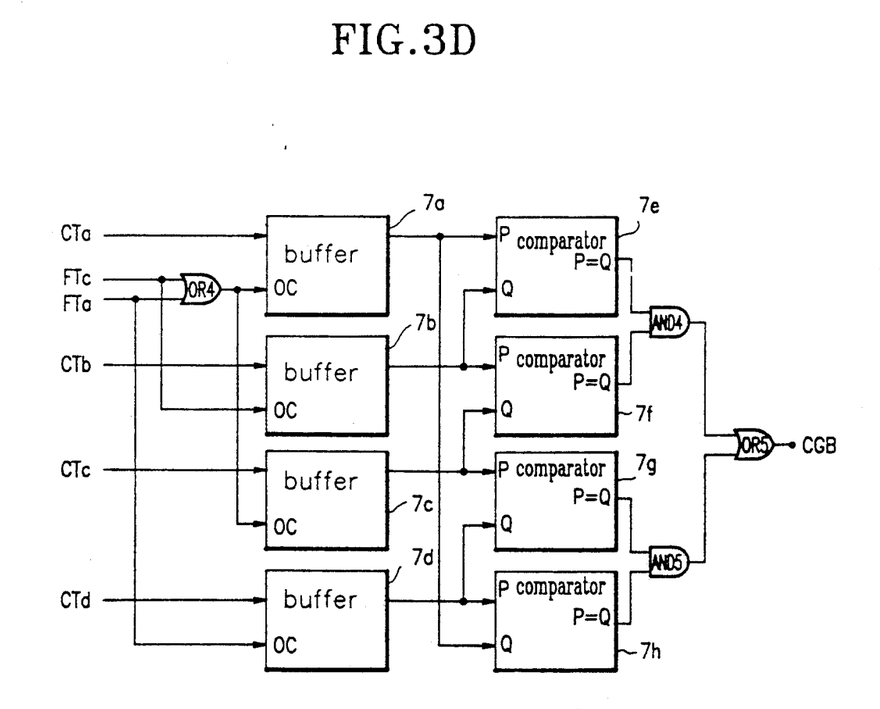

FIG. 3D shows a detailed block diagram of center guard bar detector 7 in FIG. 2 comprising:

buffers 7b, 7d for outputs to be enabled by impulse signals FTc, FTa of pulse generator 2 and for buffering count signals CTb, CTd of the counter 3, respectively, buffers 7a, 7c for outputs to be enabled by impulse signals FTc, FTa through OR gate OR4, and for buffering count signals CTa, CTc of the counter 3, respectively, comparators 7e-7h for comparing count signals CTa-CTd of the buffers 7a-7d, respectively, AND gates AND4, AND5 for ANDing signals of the comparators 7e, 7f, respectively, and an OR gate OR5 for ORing signals of the AND gates AND4, AND5 and applying the ORed signals as a center guard bar signal CGB to the controller 12.

Figure 3E:
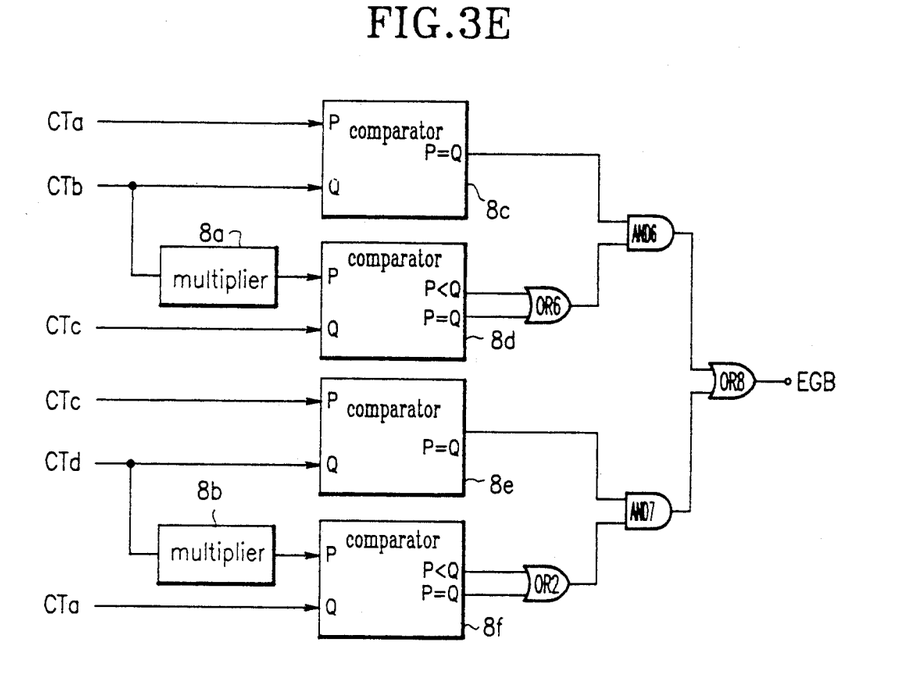

FIG. 3E shows a detailed block diagram of end guard detector 8 in FIG. 2 comprising:

multipliers 8a, 8b for multiplying count signals CTb, CTd of the counter 3 by 4, comparators 8d, 8f for comparing count signals CTc, CTa of the counter 3 with outputs of the multipliers 8a, 8b, comparators 8c, 8e for comparing count signals CTa, CTc of the counter 3 with count signals CTb, CTd, AND gates AND6, AND7 for ANDing outputs of the comparators 8c, 8e, outputs of the comparators 8d, 8f through OR gates OR6, OR7, and start guard bar signals SGB1, SGB2 of the start guard bar detector 4, respectively, and an OR gate OR8 for ORing outputs of the AND gates AND6, AND7 and applying the ORed signal as an end guard bar signal EGB to the controller 12.

Figure 3F:
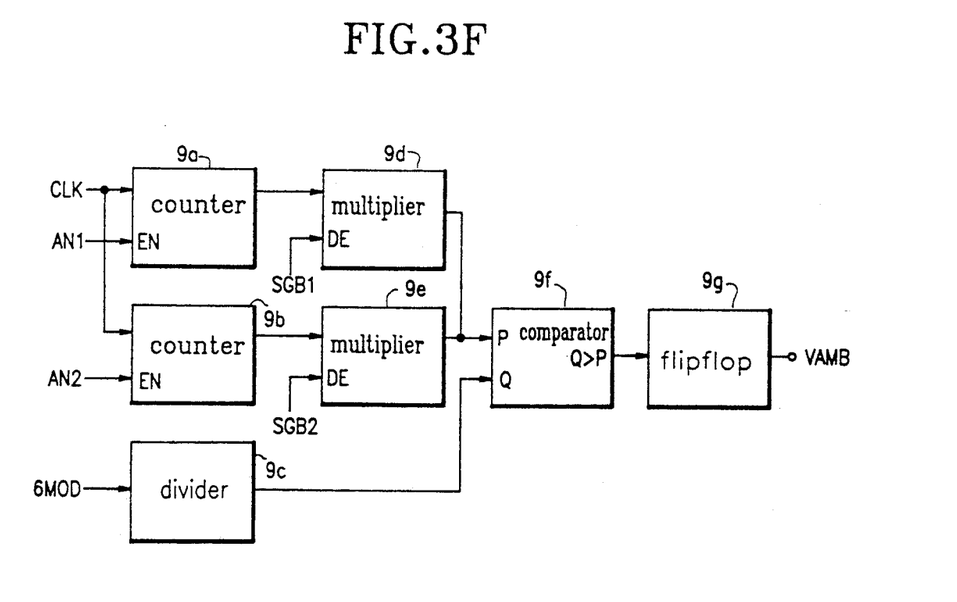

FIG. 3F shows a detailed block diagram of similar character discriminator 9 in FIG. 2 comprising:

counters 9a, 9b for counting to be enabled by address enable signals AN1, AN2 of the controller 12 when start guard signals SBG1, SGB2 of the start guard bar detector 4 are detected, and for counting clock pulse CLK of the counter 3, multipliers 9d, 9e for outputs to be enabled by start guard bar signals SGB1, SGB2 of the start guard detector 4 and for multiplying outputs of the counters 9a, 9b, a divider 9c for dividing 6MOD of the basic module generator 5 by 2 and generating basic module 3MOD, a comparator 9f for comparing outputs of the multiplers 9d, 9e with output of the divider 9c, and a flip flop 9g for receiving output of the comparator 9f and applying similar character discrimination signal VAMB to FIFO memory 14.

Figure 3G:
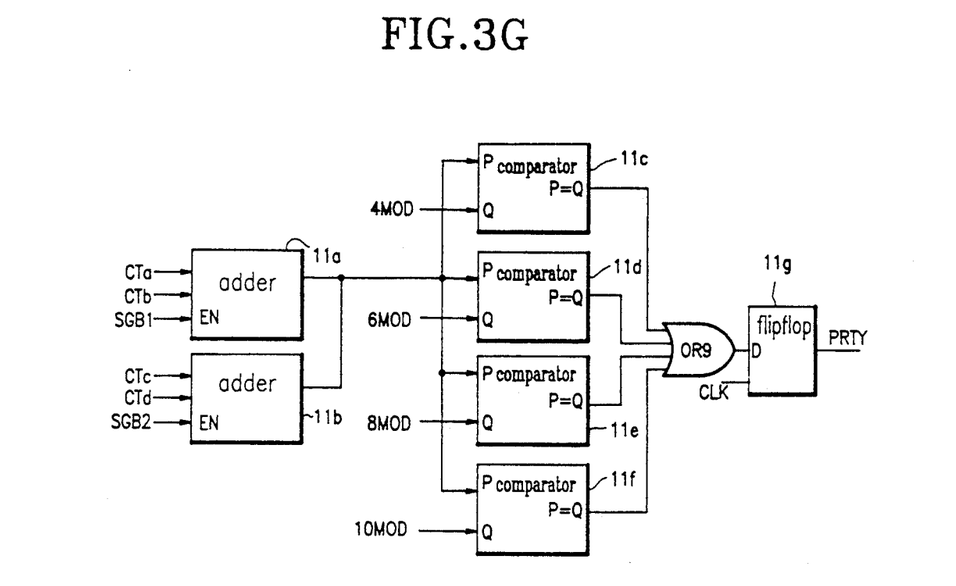

FIG. 3G shows a detailed block diagram of parity checker 11 in FIG. 2 comprising:

addres 11a, 11b for adding to be enabled by start guard bar signals SGB1, SGB2 of thestart guard bar detector 4 and for adding count signals CTa, CTb and CTc, CTd of the counter 3, comparators 11c–11f for comparing outputs of the adders 11a, 11b with basic modules 4MOD, 6MOD, 8MOD, 10MOD of the basic module generator 5, an OR gate OR9 for ORing outputs of the comparators 11c–11f, and a flip flop for receiving outputs of the OR gate OR9 and applying to FIFO memory 14 a parity signal PRTY indicating an even parity or an odd parity.

Figure 3H:
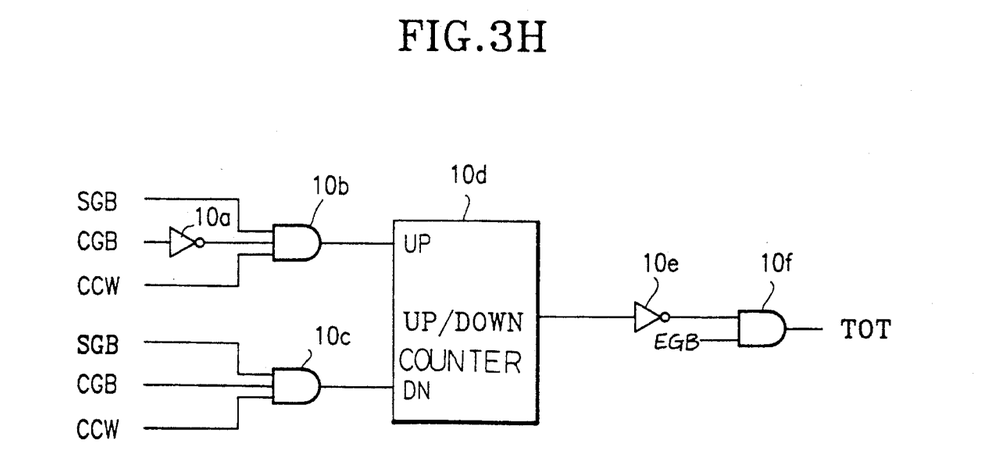
Figures 4A, 4B:
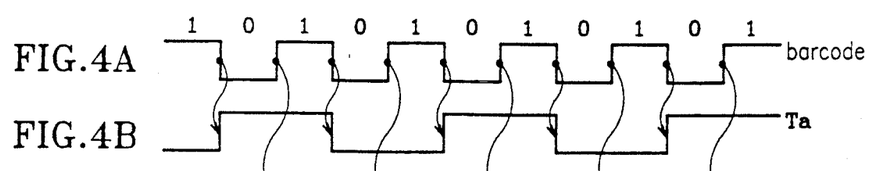
FIGS. 4A-4E show output waveforms of pulse generating units of FIG. 2.
Figure 4C:
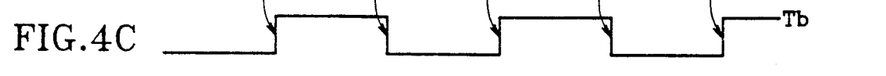
Figure 4D:
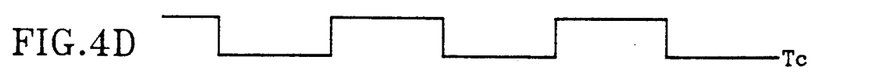
Figure 4E:
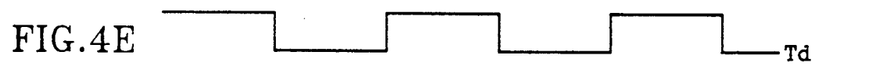

FIG. 3H shows a detailed circuit of the total character checking means 10 of FIG. 2 comprising an inverter 10a for inverting a center guard bar signal CGB of the center guard bar detecting unit 7, an AND gate 10b for ANDing an output of said inverter 10a, a start guard bar signal SGB of the start guard bar detecting unit 4, and a character width comparing signal CCW, an up/down counter 10d for up-counting output signal of said AND gate 10b and down-counting output of said AND gate 10c, and an AND gate 10f for ANDing a signal outputted from said up/down counter 10d and having passed through an inverter 10e with an end guard bar signal EGB of the end guard bar detector 8 and outputting a total character signal TOT.

Figure 6:
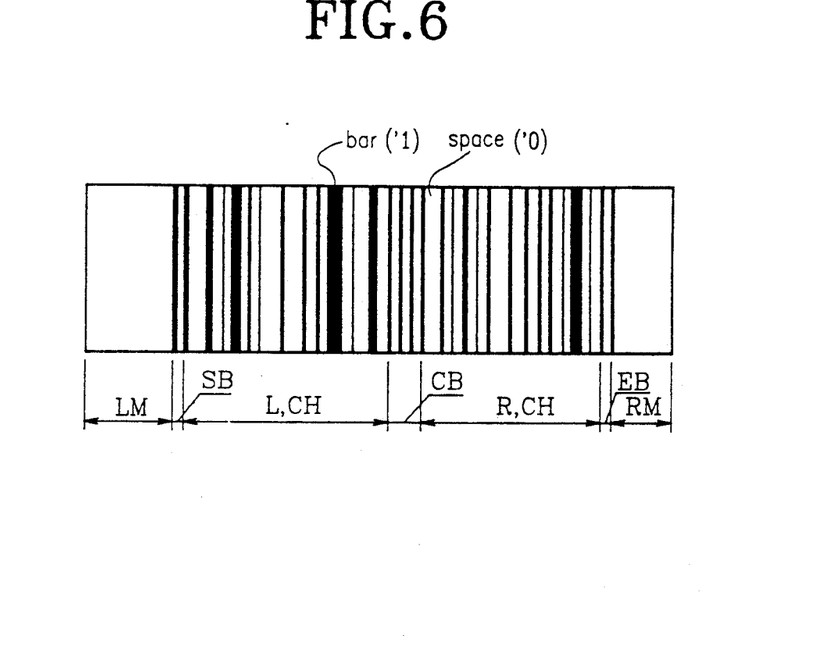
FIG. 6 shows barcode configuration for explaining the present invention.

FIG. 6 shows an example of a barcode which is used in the present invention. As shown in FIG. 6, a bar ("1") and a space ("0"), both of which become units in the barcode, are referred to as a module, respectively. As can be seen from the left end of a barcode, there are a left margin LM more than 11 modules, start guard bar SB which indicates barcode start, left characters, L, CH constituted with 7 modules, center guard bar CB on the center, right characters R, CH, end guard bar EB indicating the end of the barcode, and a right margin RM of the right barcode more than 7 modules.

And also, one character consists of 2 spaces and 2 bars. On the left of the center guard bar CB, a space, a bar, a space, and a bar appear by turns, on the right of the center guard bar CB, a bar, a space, a bar and a space appear by turns, which makes scanning possible in both directions.

The start guard bar SB is constituted with modules of 1, 0, 1, the center guard bar CB with those of 0, 1, 0, 1, 0, and the end guard bar EB with those of 1, 0, 1.

The operation and effect of the present invention having such a configuration will be described in detail as following.

When an optical signal scattered from a barcode is detected in barcode detector 1 and changed to a digital signal as shown in A of FIG. 4, pulse generator 2 generates toggle signals Ta-Td as shown in B-E of FIG. 4. That is, whenever a barcode signal changes from a high potential "1" to a low potential "0", a toggle signal Ta converted as in FIG. 4B and a toggle signal Tc as in FIG. 4D which in opposite to the toggle signal Ta are generated. Whenever a barcode changes from a low potential "0" to a high potential "1", a toggle signal Tb converted as in FIG. C and a toggle signal Td as in FIG. 4E which is opposite to the toggle signal Tb are generated. And also, whenever falling edges of the toggle signals Ta-Td are met, impulse signals FTa-FTd are generated.

Accordingly, when a barcode with a margin section T1, a barcode start section T2, a character section T3 and a center guard bar section T4 as in A of FIG. 7 is generated from the barcode detector 1 and applied to the pulse generator 2. Whenever a barcode changes from "1" to "0", toggle signals Ta, Tc toggling in an opposite direction are generated in the pulse generator 2 as in FIG. 7B to FIG. 7D. At the same time, whenever the barcode signal changes from "0" to "1", toggle signals Tb, Td toggling in an opposite direction are generated as in C-E of FIG. 7C to FIG. 7E. Whenever edges falling from "1" to "0" in the toggle signals Ta-Td are met, impulse signals FTa-FTd are generated. Such toggle signals Ta-Td and impulse signals FTa-FTd are applied to counter 3, the counter 3 counts width of the respective toggle signals Ta-Td and stores their width until counting of next respective toggle signals is finished. The stored count signals CTa-CTd are generated in 8 bits, respectively, and applied to start guard bar detector 4.

That is, at this time, the count signals CTa-CTd are, respectively, applied to input terminals P of comparators 4c–4f in the start guard bar detector 4, the count signals CTc, CTa are respectively applied to input terminal Q of the comparators 4d, 4f, and the count signals CTb, CTd are applied to input terminals Q of the comparator after multiplied by 4.

Accordingly, when the count signals CTb, CTc are the same, the comparator 4d generates a high potential signal. When the count signals CTd, CTa are the same, the comparator 4f generates a high potential signal. When the count signal CTa is greater or equal to the 4 times multiplied count signal 4CTb from the multiplier 4a, the comparator 4c generates a high potential signal. When the count signal CTc is greater or equal to the 4 times multiplied count signal 4CTb from the multiplier 4b, the comparator 4d generates a high potential signal. Since a barcode can be scanned in left or right direction, start guard bar is considered to be constituted with toggle signals Ta, Tb, Tc, or Tc, Td, Ta. And also, when standard goes to right margin RM which is smaller compared to left margin LM, the right margin RM has at least 7 modules plus 1 module of the start guard bar. As a result, the count signal CTa of the toggle signal Ta can have 8 modules and the count signals CTb, CTc of the toggle signals Tb, Tc have 2-module-value, respectively. According to this, when CTa≧4CTb and CTb=CTc, it is possible to become a start guard bar.

Figures 7A, 7B:
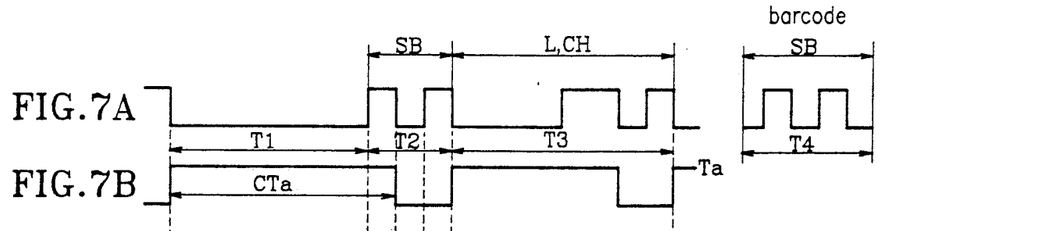
FIGS. 7A-7E show output waveforms of pulse generating units of FIG. 2 with respect to left barcode of FIG. 6.
Figure 7C:
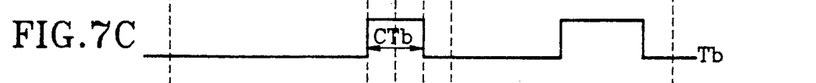
Figure 7D:
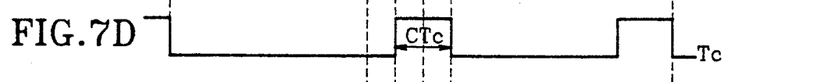
Figure 7E:
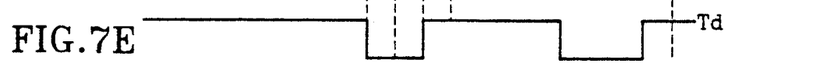
Figure 8A:
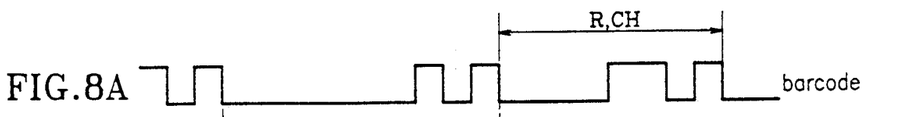
FIGS. 8A-8E show output waveforms of pulse generating units of FIG. 2 with respect to right barcode of FIG. 6.

As a result, when a barcode signal as in FIG. 7A is generated from the barcode detector 1 after a barcode has scanned from left to right and when the count signal of the counter 3 meets the conditions of CTb=CTc and CTa≧4CTb, the comparators 4d, 4c generate high potentials. According to this, a start guard bar signal SGB1 of a high potential is produced from AND gate AND1 and a start guard bar signal SGB is generated through OR gate OR3. And also, when a barcode signal as in FIG. 8A is generated from the barcode detector 1 after a barcode has scanned from right to left and when the count signal of the counter 3 meets the conditions of CTd=CTa and CTc≧CTd, the comparators generate high potentials. According to this, a start guard bar signal SGB2 of a high potential is generated from the AND gate AND2 and a start guard bar signal SGB of a high potential is produced via OR gate OR3.

In case that a start guard bar is detected and applied to controller 12 as mentioned above, the controller 12 generates an address start guard bar signal ASGB1 or ASGB2 and enables buffers 5a, 5b or 5c, 5d in basic module generator 5 for outputs. That is, when the start guard bar signal SGB1 is detected from the start guard bar detector 4, the controller 12 applies the address start guard bar signal ASGB1 to output enable terminal OC of the buffers 5a, 5b in order to enable them. According to this, the count signals CTb, CTc of the counter 3 are buffered in the buffers, 5a, 5b multiplied and added in multiplier/adder 5e and generated as basic modules 4MOD, 6MOD, 8MOD, 10MOD. In another way, when the start guard bar signal SGB2 is detected from the start guard bar detector 4, the controller 12 generates the address start guard bar signal SAGB2 and enable the buffers 5c, 5d. According to this, the count signals CTa, CTd of the counter 3 are buffered in the buffers, 5c, 5d and generated as basic modules 4MOD, 6MOD, 8MOD, 10MOD via the multiplier/adder 5e.

Figure 8B:
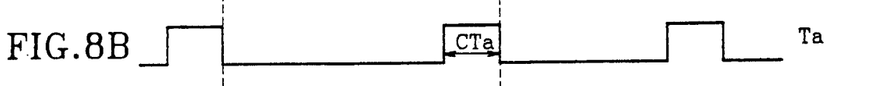
Figure 8C:
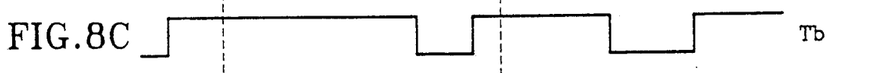
Figure 8D:
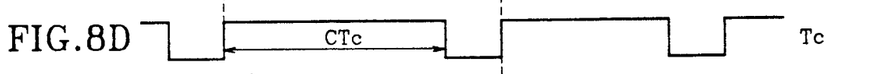
Figure 8E:
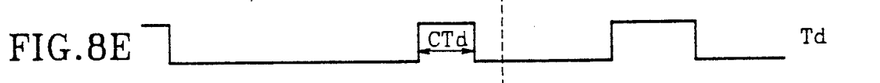

The basic modules 6MOD, 8MOD generated as in the above are applied to comparators 6d, 6e of character width comparator 6. And also, when the start guard bar signal SGB1 is generated from the start guard bar detector 4, one character is constructed with the toggle signals Ta, Tb, Tc of the pulse generator 2 as in FIG. 7B to FIG. 7D, and when the start guard bar signal SGB2 is generated, one character is constituted with the toggle signals Tc, Td, Ta of the pulse generator 2 as FIGS. 8D, 8E and 8B. Therefore, in case of the start guard bar signal SGB1, the end of one character is indicated by an impulse signal FTc notifying the end of the toggle signal Tc as in D of FIG. 7, where the length of one character is known by means of a count signal CTa+CTc of the counter 3. And also, in case of the start guard bar signal SGB2, the end of one character is indicated by an impulse signal FTa notifying the end of the toggle signal Ta as in FIG. 8B, where the length of one character is known by means of a count signal CTc+CTa of the counter 3.

When the start guard bar signal SGB of the start guard bar 4 is detected and one character is finished in the controller 12 by doing as mentioned above, a character signal CHAR is generated to enable buffers 6a, 6b of character width comparator 6. According to this, the count signals CTa, CTc of the counter 3 are buffered in the buffers 6a, 6b, added to CTa+CTc in adder 6c and applied to input terminals Q, P of the comparators 6d, 6e. At this time, since the basic modules 6MOD, 8MOD remain applied to the input terminals P, Q of the comparators 6d, 6e, the comparator 6d compares a module of the character signal generated from the adder 6c with the basic module 6MOD generated from the basic module generator 5, so that a high potential signal is generated when the module of the character signal is greater. And also the comparator 6e compares a module of the character signal generated from the adder 6c with the basic module 8MOD, so that a high potential signal is generated when the basic module 8MOD is greater. That is, when the count signal CTa+CTc of the length of one character generated from the adder 6c of the character width comparator 6 becomes normal 7 modules greater than the basic module 6MOD but smaller than the basic module 8MOD, the comparators 6d, 6e all generates high potentials, so that a character width comparison signal CCW considered as a normal character in AND gate AND3 is produced and applied to the controller 12.

In the meantime, center guard detector 7 detects 0, 1, 0, 1, 0 from center guard bar section T4 as in A of FIG. 7. At this time, in case that a start guard bar signal SGB1 is detected from start guard bar detector 4, the controller 12 generates an impulse signal FTc notifying the end of one character as mentioned above to enable buffer 7b as well as buffers 7a, 7c through OR gate OR4. Thus, the count signals CTa, CTc of the counter 3 are buffered through the buffers 7a, 7b, 7c and compared in comparators 7e, 7f. At this time, since a high potential signal is generated from the comparators 7e, 7f when the count signals CTb, CTc are the same each other, a high potential signal is generated from AND gate AND4 and produced as a center guard bar signal CGB via OR gate OR5. In another way, in case that a start guard bar signal SGB2 is detected from the start guard bar detector 4, the controller 12 generates an impulse signal FTa notifying the end of one character to enable buffer 7d as well as the buffers 7a, 7c via OR gate OR4. Thus, the count signals CTa, CTc, CTd of the counter 3 are buffered in the buffers 7a, 7c, 7d and compared in comparators 7g, 7h. At this time, since a high potential signal is generated from the comparators 7g, 7h when the count signals CTa, CTc, CTd and are same each other, a high potential signal is generated from AND gate AND5 and produced as a center guard bar signal CGB. The center guard bar signal CGB according to detection of the center guard bar 01010 is applied to the controller 12 and the pulse generator 2, and then the pulse generator 2 converts the barcode signal in order for left and right character structures of a center guard bar in reverse to each other to have the same structures to each other. By doing so, it is possible to construct a more efficient circuit configuration.

As mentioned above, detection of whether or not characters following since the center guard bar exist is provided.

Thereafter, when a series of characters are ended, end guard bar detector 8 checks whether end guard bar 1, 0, 1 comes from the counter 3. At this time, the count signals CTa, CTb and CTc, CTd generated from the counter 3 as end guard bar signals are compared in comparators 8c, 8e. When these signals are equal to each other in the above comparison, a high potential signal is generated. And also, 4 times multiplied count signals 4CTb, 4CTd via comparators 8a, 8b in the end guard bar detector 8 and the count signal of the counter 3 are compared in the comparators 8d, 8e. From this comparison, when the 4 times multiplied count signals 4CTb, 4CTd are greater or equal to the count signals CTd, CTa, a high potential signal is generated through OR gates OR6, OR7. At this time, when a start guard bar signal SGB1 is detected in start guard bar detector 4, an end guard bar constituted with the count signals CTa-CTc is detected in AND gate AND6, when a start guard bar signal SGB2 is detected, another end guard bar constituted with the count signals CTc, CTd, CTa is detected in AND gate AND7. In the meantime, in case that the start guard bar signal SGB1 instead of the start guard bar signal SGB2 is detected, toggle signals Ta, Tb of the pulse generator 2 occupies two modules of 101 respectively so that the count signals CTa, CTb of the counter 3 become the same each other and the count signal CTc has its length at least more than 8 modules since the count signal CTc includes right margin RM as in FIG. 6. Accordingly, in case that the start guard bar signal SGB1 is detected in the start guard bar detector 4 and the count signals CTa-CTc meet the conditions of CTa=CTb and 4CTb≦CTc, a high potential signal is generated from the AND gate AND6 and then produced as an end guard bar signal EGB via OR gate OR8. Differently from the above, in case that the start guard bar signal SGB2 is detected, the toggle signals Tc, Td of the pulse generator 2 occupies two modules of 101 respectively so that the count signals CTc, CTd of the counter 3 become the same each other and the count signal CTa has its length at least more than 8 modules since the count signal CTa includes left margin LM. Accordingly, when the start guard bar signal SGB2 is detected in the start guard bar detector 4 and the count signals CTa, CTc, CTd meet the conditions of CTc=CTd and 4CTd≦CTa, a high potential signal is generated from AND gate AND7 and then produced as an end guard bar signal EGB through OR gate OR8. The end guard bar signal EGB generated from the end guard bar detector 8 as mentioned above is applied to the controller 12.

Figure 5:
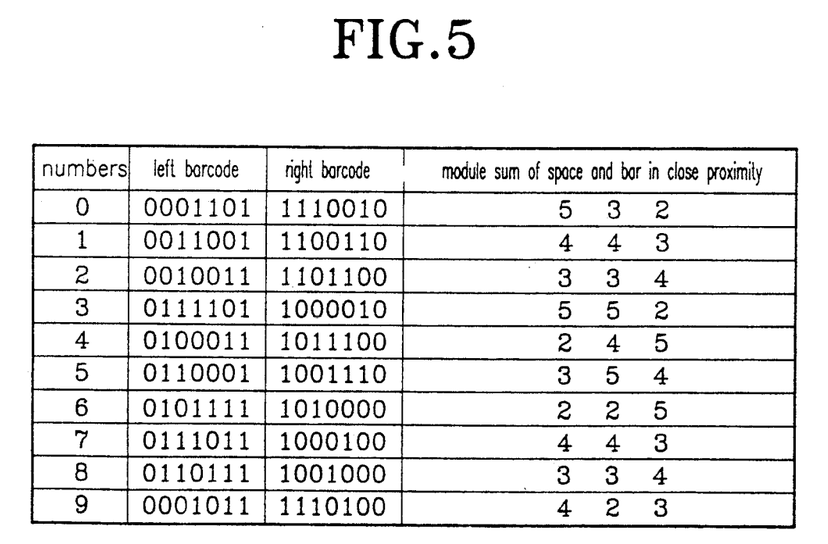
FIG. 5 shows character configuration of barcode according to FIG. 2.

By the way, error can be included in a barcode detected by means of the barcode detector 1 because of misprint or other causes of the barcode' own. Use of the toggle signals Ta, Tb, Tc, Td toggling on every edge of a barcode for the purpose of reduction of these errors causes characters to be discriminated as in table of FIG. 5 so that characters 1 and 7, 2 and 8 are recognized as the same character, respectively. That is, since the count signals CTa, CTc of the counter 3 is a value of a module which a space and a bar in close proximity to each other are summed, and the count signals CTb, CTd is a value of a module which a bar and a space in close proximity to each other are summed, the characters 1 and 7, 2 and 8 are recognized as the same character, respectively. On looking into characters of 1 and 7 of two types of similar characters, since the toggle signals Ta, Tb, Tc are generated as in B, C, D of FIG. 9 when a barcode signal with respect to a barcode "1" is produced as in A of FIG. 9, the count signals CTa, CTb, CTc become 4, 4, 3. When a barcode signal with respect to a barcode "7" is generated as in A of FIG. 10, the toggle signals Ta, Tb, Tc are produced as in B, C, D of FIG. 10 so that the count signal CTa, CTb, CTc become 4, 4, 3. By the way, in case of sections T11, T12 as in A of FIG. 9 and as in A of FIG. 10, a character "1" is constructed with two modules and a character "7" with one module. Even in case of characters "2" and "8", a character "2" is constituted with two modules and a character "8" with one module.

Figure 9A:
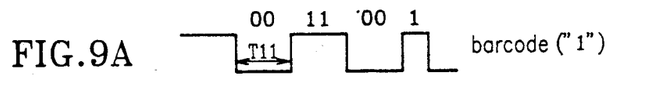
FIGS. 9A-9D and FIGS. 10A-10D show similar character timing for discriminating similar character in similar character discrimination unit of FIG. 2.
Figure 9B:
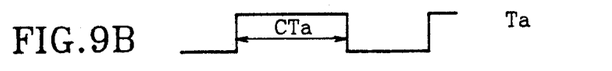
Figure 9C:
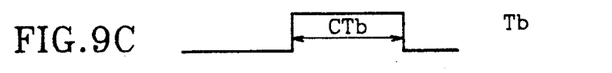
Figure 9D:
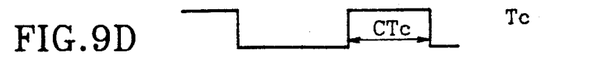
Figure 10A:
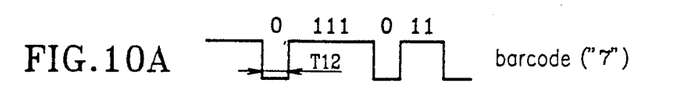
Figure 10B:
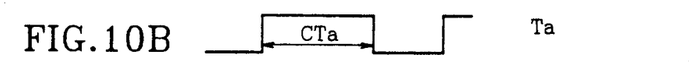
Figure 10C:
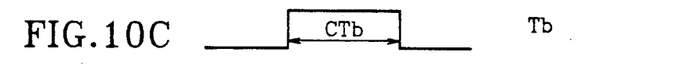
Figure 10D:
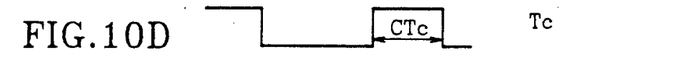
Figure 11A:
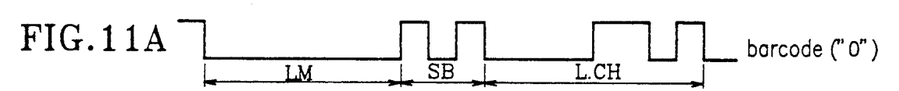
FIGS. 11A-11D show waveforms for exaplaing scan direction discrimination of barcode in parity check unit of FIG. 2.
Figure 11B:
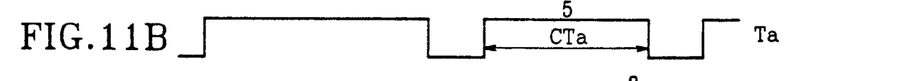
Figure 11C:
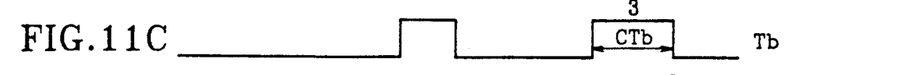
Figure 11D:
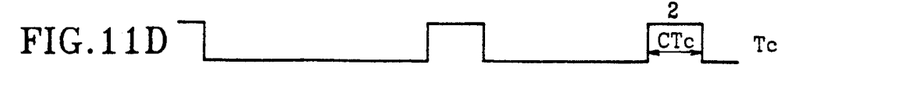

Accordingly, use of a module difference of the sections T11, T12 enables similar characters to be discriminated.

That is, when the start guard bar signal SGB1 is detected, the controller 12 applies an address enable signal AN1 to similar character discriminator 9 during sections T11, T12 of FIG. 9 and FIG. 10 and enables counter 9a. When the start guard bar signal SGB2 is detected, the controller generates an address enable signal AN2 during sections T11, T12 and enables counter 9b. According to this, since the counters 9a, 9b count intervals of character sections T11, T12 with clock signal CLK generated from the counter 3 as long as address enable signals AN1, AN2 of the controller 12 exist, the section T11 has two-module value and the section T12 has one-module value. Thus, in case that the start guard bar signal SGB1 is detected, one-module value of two-module value generated from the counter 9a is multiplied by 2 in multiplier 9d and applied to input terminal P of comparator 9f. In case that the start guard bar signal SGB2 is detected, one-module value or two-module value generated from the counter 9b is multiplied by 2 in comparator 9e and applied to the input terminal P of the comparator 9f. At this time, the basic module 6MOD generated from the basic module generator 5 is divided by 2 in divider 9c and applied to input terminal Q of the comparator 9f. According to this, the comparator 9f compares three-module value via the divider 9c with 2-module value or 4-module value via the multipliers 9d, 9e. If the 2- or 4-module value is greater than the 3-module value, a low potential signal indicating "1" or "2" is produced from "1" and "7", "2" and "8" of similar characters. If the 2- or 4-module value is smaller than the 3-module value, a high potential signal indicating character "7" or "8" is produced. Such signals of the comparator 9f is applied to the FIFO memory 14 as a similar character discrimination signal VANB through flip flop 9g.

And also, every time counting of the counter 3 is finished, total character checker 10 increases count and identified if the same number of characters from the left and the right of a center guard bar 01010 are sensed from the counter 3. If not the same, the total character checker applies its result to error checker 13 through the controller 12 to make an error. That is, under the state that a center guard bar signal is not outputted from the center guard bar detecting unit 7, the AND gate 10c maintains a low potential signal outputted and a high potential signal is outputted from the inverter 10a and applied to the AND gate 10b. As a result, a start guard bar signal SGB is outputted from the start guard bar detecting unit 4, thereafter a high potential signal is outputted from the AND gate 10b, whenever a character width comparing signal CCW is outputted from the character width comparing unit 6, and applied to an up-terminal of the up/down counter 10*d* and then up-counted thereat.

In addition, under the state that a center guard bar signal CGB is outputted from the center guard bar detecting unit 7, a low potential signal is outputted from the inverter 10*a*, so that the AND gate is maintained a low potential signal outputted, at this moment since a start guard bar detecting unit 4, a high potential signal is outputted from the AND gate 10*c*, whenever a character width comparing signal CCW is outputted from the character width comparing unit 6, and this high potential signal is applied to a down-terminal DN of the up/-down counter 10*d* and down-counted thereat. Accordingly, when the characters at both the left and the right sides of the center bars "01010" are detected in the same numbers, the counting value of the up/down counter 10*d* becomes "0" so that a low potential signal is outputted, and this low potential signal is inverted into a high potential signal by the inverter 10*e* and applied to an input terminal of the AND gate 10*f*. As a result, when an end guard bar signal EGB is outputted from the end guard bar detecting unit 8, a total character signal TOT is outputted from the AND gate 10*f* and applied via the control unit 12 to the error checking unit 13. And, the parity checker 11 checks whether a barcode comes from the left or from the right of the center guard bar 01010 and gives its result to FIFO memory 14.

That is, count signals CTa, CTb and CTc, CTd of one character generated from the counter 3 are respectively applied to adders 11*a*, 11*b*. According to this, the count signals CTa, CTb are added in the adder 11*a* in case that the start guard bar signal SGB1 is detected, and the count signals CTc, CTd are added in the adder 11*b* in case that the start guard bar signal SGB2 is detected. Addition signals of the adders 11*a*, 11*b* are applied to comparators 11*c*-11*f* and compared with the basic moules 4MOD, 6MOD, 8MOD, 10MOD of the basic module generator 5. If equal each other in the comparison, a high potential signal is produced. Since only one high potential signal from the comparators 11*c*-11*f* is enough to generate a high potential signal from OR gate OR9, parity discrimination signal PRTY of a high potential is generated from the flip flop 11*g* and applied to the FIFO memory 14.

As an example, an even parity or an odd parity is generated according to the direction taken for scanning a barcode, that is, from left to right or vice versa. Namely, in case of a character "0", module sum of space and bar of a barcode in close proximity becomes 5, 3, 2 as shown in table of FIG. 5. When scanning is performed from the left and a barcode signal with respect to the character "0" is generated as in A of FIG. 11, the toggle signals Ta, Tb, Tc are produced as in B, C, D of FIG. 11 and the count signals CTa, CTb, CTc become 5, 3, 2. And also, at this time, in case that scanning is performed from the left and a start guard bar signal SGB1 is detected in bar detector 4, adder 11*a* is enabled and adds the count signals CTa, CTb. The added signal becomes an even number 8 which is equal to the basic module 8MOD. Therefore, a high potential signal is generated from comparator 11*e* and a high potential signal is produced from OR gate OR9, so that a parity discrimination signal PRTY of a high potential indicating an even number is generated from flip flop 11*g* and applied to FIFO memory 14. Therefore, it is revealed that a barcode has been read from the left.

In the meantime, in case that scanning is performed from the right and a start guard bar signal SGB2 is detected in bar detector 4, adder 11*a* is enabled and adds the counter signals CTc, CTd. The added signal becomes an odd number which is different from the basic module 4MOD, 6MOD, 8MOD, 10MOD. Therefore, low potential signals are generated from all the comparators 11*c*-11*f* and a low potential signal is generated from OR gate OR9, so that a parity discrimination signal PRTY of a low potential indicating an odd number is generated from flip flop 11*g* and applied to FIFO memory 14. Therefore, it is revealed that a barcode has been read from the right.

In the meantime, the controller 12 receives a start guard bar signal SGB from the start guard bar detector 4 and controls the system, receives a character width comparison signal CCW to check if a character is proper and applies, if decided as proper, to FIFO memory 14 parity, data of count signals CTa-CTd consisting of a character, character width data indicating total length of one character, and similar character discrimination signal VAMB capable of discriminating similar character.

Thus, when a proper barcode is detected after an end guard bar has been finished, the controller 12 applies data stored in FIFO memory 14 to the microprocessor 1. At this time, the controller 12 converts the count signals CTa-CTd constructing respective characters into respective characters and divides to check digit. Thereafter, when data is decided as perfect, the controller 12 transmits the perfect data to the host computer 17 through interface 16.

As described above in detail, the present invention has the effects that error due to ink spread can be reduced, components can be made smaller and a barcode can be scanned at a high speed.

What is claimed is:

1. barcode reader decoding system comprising:

barcode detecting means for detecting an optical signal scattered from a barcode and converting said optical signal to a digital signal, pulse generating means for generating toggle signals toggling every time said digital signal of said barcode detecting means changes from a high potential to a low potential and vice versa, and toggle signals opposite to said toggle signals, counting means for counting width of said toggle signals of said pulse generating means, start guard bar detecting means for checking a start guard bar of a barcode from a count signal of said counting means, basic module generating means for generating a basic module which carries a multiple of said count signal of said counting means with respect to one module of a character when a start guard bar signal is detected from said start guard bar detecting means, character width comparing means for generating a character width comparating signal after checking if said character is properly constructed with seven modules by using the basic module of said basic module generating means when a count signal of one character comes from said counting means, center guard detecting means for converting a barcode signal by generating a center guard bar signal to said pulse generating means after checking a center guard bar of a barcode from the count signal of said counting means, end guard bar detecting means for checking an end guard bar of a barcode from the counting signal of said counting means, similar character discriminating means for generating to FIFO (first-in and first-out) memory unit a discrimination signal for discrimination a counter value of a module which space and bar in close proximity are summed and a counter value of a module which bar and space in close proximity are summed from said counting means in order to prevent error when a character is recognized, total character checking means for generating a total character signal by checking if the same number of characters is carried on the left as well as on the right of a center guard bar from the count signal of said counting means, parity checking means for generating an odd parity and an even parity to said FIFO memory unit by checking if a barcode from the count signal of said counting means comes from the left or from the right, control means for storing in said FIFO memory unit outputs of said parity checking means, counting means and similar character discriminating means by checking outputs from said start guard bar detecting means and character width comparing means, and controlling transmission of data of said FIFO memory unit to a host computer through a microprocessor and an interface unit by checking outputs of said end guard bar detecting means and total character checking means, and error checking means for checking error by receiving the total character signal of said total character checking means through said control means.

2. The system as claimed in claim 1, wherein said start guard bar detecting means comprises:

multipliers for multiplying 4 by second and fourth count signals of said counting means, first and third comparators for comparing the first and third counting signals of said counting means with outputs of said multipliers, and second and fourth comparators for comparing said first and third counting signals with said second and fourth counting signals of said counting means, and AND gates for generating start guard bar signals by respectively ANDing outputs of said first and second comparators and second comparators.

3. The system as claimed in claim 1, wherein said basic module generating means comprises:

first to fourth buffers for buffering said second and third count signals and fourth and first count signals of said counting means under control of address start guard bar signals generated from said control means according to start guard bar signals of said start guard bar detecting means, and multiplier/adder for generating basic modules by multiplying and adding outputs of said buffers.

4. The system as claimed in claim 1, wherein said character width comparing means comprises:

buffers for respectively buffering the count signals of said counting means by a character signal of said control means, adder for adding outputs of said buffers, comparators for comparing said outputs of said adder with basic modules 6MOD, 8MOD of said basic module generating means, and AND gate for generating a character width comparison signal by ANDing outputs of said comparators.

5. The system as claimed in claim 1, wherein said center guard bar detecting means comprises:

buffers for buffering the count signals of said counting means by impulse signals of said pulse generating means, and buffers for buffering the count signals of said counting means by said impulse signal, comparators for comparing outputs of said buffers each other, and AND gates for generating a center guard bar signal through OR gate by ANDing outputs of said comparators.

6. The system as claimed in claim 1, wherein said end guard bar detecting means comprises:

multipliers for multiplying 4 by count signals of said counting means, comparators for comparing outputs of said multipliers with the count signals of said counting means, and comparators for comparing the count signals with said count signals, AND gate for ANDing outputs of said comparators and the start guard bar signal of said start guard bar detecting means, AND gate for ANDing outputs of said comparators and the start guard bar signal of said start guard by detecting means, and OR gate for generating an end guard bar signal by ORing outputs of said AND gates.

7. The system as claimed in claim 1, wherein said similiar character discriminating means comprises:

counters for counting pulse clock of said counting means by address enable signals of said control means generated by the start guard bar signals of said counting means, multipliers for multiplying 2 by outputs of said counter by means of said start guard bar signals, divider for dividing basic module 6MOD of said basic module generating means by 2, comparator for comparing outputs of said multipliers with outputs of said divider, and flip flop for generating similar character discrimination signal according to the output of said comparator.

8. The system as claimed in claim 1, wherein said parity checking means comprises:

adders for adding the first and second count signals and the third and fourth count signals of said counting means by the start guard bar signals of said start guard bar detecting means, comparators for comparing outputs of said adders with basic modules of said basic module generating means, OR gate for ORing outputs of said comparators, and flip flop for generating a parity signal discriminating an even number and an odd number according to the output of said OR gate.

9. The system as claimed in claim 1, wherein said total character checking unit comprises:

a first inverter for inverting a center guard bar signal of the center guard bar signal detecting means, a first AND gate for ANDing an output of said inverter, a start guard bar signal of the start guard bar detecting unit, and a character width comparing signal of the character width comparing means, a second AND gate for ANDing said center guard bar signal, start guard bar signal and character width comparing signal, an up/down counter for up and down counting output of said first and second AND gates, and a third AND gate for ANDing a signal outputted from said up/down counter and having passed through a second inverter with an end guard bar signal of the end guard bar detecting means for outputting a total character signal.

* * * * *